Figure 1:
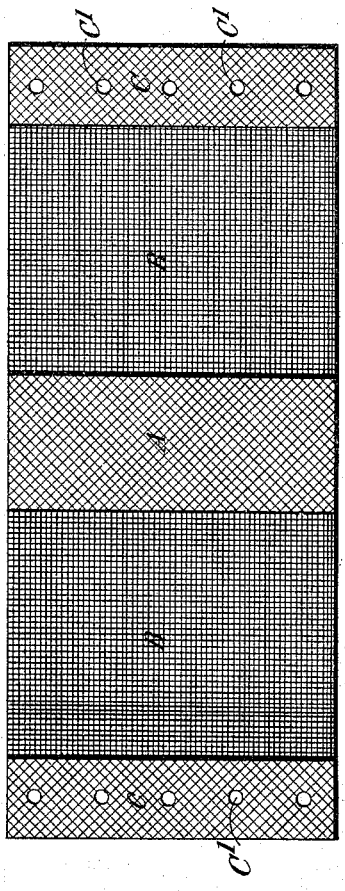

(No Model.)

J. B. DUNLOP & J. B. DUNLOP, Jr.
PNEUMATIC TIRE.

No. 534,867. Patented Feb. 26, 1895.

Witnesses:
G. W. Rea
Thos. A. Green

Inventors:
John B. Dunlop and
John B. Dunlop, Jr.
By James L. Norris
Atty

UNITED STATES PATENT OFFICE.

JOHN BOYD DUNLOP AND JOHN BOYD DUNLOP, JR., OF DUBLIN, IRELAND.

PNEUMATIC TIRE.

SPECIFICATION forming part of Letters Patent No. 534,867, dated February 26, 1895.

Application filed July 10, 1894. Serial No. 517,138. (No model.)

*To all whom it may concern:*

Be it known that we, JOHN BOYD DUNLOP, veterinary surgeon, and JOHN BOYD DUNLOP, Jr., student, subjects of the Queen of Great Britain, and residents of Black Rock, Dublin, Ireland, have jointly invented new and useful Improvements in Pneumatic Tires for Wheels of Cycles and other Vehicles, of which the following is a specification, reference being had to the accompanying drawings.

Our invention relates to pneumatic tires and has for its object to construct such tires as will not be liable to side rolling or lateral displacement. By our invention also the cloth, canvas or fabric is made to wear better and the propulsion of the vehicle is rendered easier.

According to our invention we provide an inexpansible cover or jacket of cloth, canvas or fabric which is woven or otherwise constructed on the straight—that is to say the threads thereof extend longitudinally and directly across the tire, being at right angles to one another. On the tread surface of said cover we secure by means of rubber solution or stitching a band or strip of fabric in which the threads extend diagonally across. The said band or strip may be woven or it may be formed of parallel threads held together by rubber solution and folded or twisted on itself so that the threads thereof cross each other diagonally. In a modified form of inexpansible cover we form the same of three strips of cloth or fabric secured to each other by stitches, the central strip which forms the tread being composed of threads extending and crossing diagonally and the side strips being composed of threads extending longitudinally and directly across the tire.

The tire is built up in the usual way and secured to the rim by any of the methods now in use.

We sometimes form the cover into a tube by means of lacing through eyelet holes, or by hooks in the edges of the cover, or, we may secure the cover to a suitable rim by means of hooks in the edges of the cover in a manner similar to that now in use.

When we use hooks or eyelet holes we strengthen the edges of the cover by the addition of strips or bands composed of diagonal threads, secured in place by stitching or otherwise.

We may construct the inexpansible cover in any other simple manner so that the threads forming the tread or on the tread, extend diagonally across the tire and the threads composing the sides of the cover extend directly across and not diagonally, and, when necessary the edges of the cover are strengthened by, or composed of, threads extending diagonally.

Figure 2:
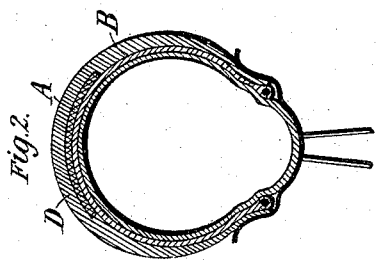

In the accompanying drawings Figure 1 is a plan of a small portion of an inexpansible cover, constructed according to our invention. Fig. 2 is a section of a tire and rim.

A is the diagonal center strip or tread portion of the inexpansible cover; B, B, the parts which ultimately form the sides of the tire and which are composed of straight cloth or fabric.

C, C are the edges formed with diagonal threads and provided with eyelet holes C'.

D is the outer rubber cover.

We sometimes dispense with the diagonal threads in the edges C, C. For example in Fig. 2 which is a section of a tire secured in place on the rim by means of endless cores contained in the edges of the tire, the said edges may be of straight fabric similar to the parts B, B.

What we claim as our invention is—

1. For a pneumatic tire, an inexpansible cover having its sides composed of longitudinal threads extending circumferentially round the wheel and transverse threads perpendicular to said longitudinal threads, and its tread portion composed of or braced by diagonal threads, substantially as, and for the purposes, specified.

2. For a pneumatic tire, an inexpansible cover having its sides composed of longitudinal threads extending circumferentially round the wheel and transverse threads perpendicular to said longitudinal threads, and its tread portion and edges composed of or braced by diagonal threads, substantially as, and for the purposes, specified.

In witness whereof we have hereunto set our hands this 28th day of June, 1894.

JOHN BOYD DUNLOP.
JOHN BOYD DUNLOP, JUNIOR.

Witnesses:
 LAURENCE J. O'HIGGINS,
  *34 Westland Row, Dublin.*
 ROBERT WALKER,
  *Allendale, Drumcondra, Dublin.*